United States Patent
Zhou et al.

(10) Patent No.: US 12,046,925 B2
(45) Date of Patent: Jul. 23, 2024

(54) WIRELESS CHARGING RECEIVER AND WIRELESS CHARGING METHOD

(71) Applicant: Huawei Digital Power Technologies Co., Ltd., Shenzhen (CN)

(72) Inventors: Di Zhou, Dongguan (CN); Le Wang, Xi'an (CN); Xiaoqing Hu, Dongguan (CN)

(73) Assignee: HUAWEI DIGITAL POWER TECHNOLOGIES CO., LTD., Shenzhen (CN)

(*) Notice: Subject to any disclaimer, the term of this patent is extended or adjusted under 35 U.S.C. 154(b) by 525 days.

(21) Appl. No.: 17/383,661

(22) Filed: Jul. 23, 2021

(65) Prior Publication Data

US 2022/0014048 A1    Jan. 13, 2022

Related U.S. Application Data

(63) Continuation of application No. PCT/CN2019/105341, filed on Sep. 11, 2019.

(30) Foreign Application Priority Data

Jan. 25, 2019 (CN) .......................... 201910074396.7

(51) Int. Cl.
    *H02J 50/80*  (2016.01)
    *H02J 50/12*  (2016.01)

(52) U.S. Cl.
    CPC ............... *H02J 50/80* (2016.02); *H02J 50/12* (2016.02); *H02J 2310/22* (2020.01)

(58) Field of Classification Search
    CPC ........ H02J 50/80; H02J 50/12; H02J 2310/22; H02J 2207/10

(Continued)

(56) References Cited

U.S. PATENT DOCUMENTS 9,413,197 B2 * 8/2016 Tsai ...................... H02J 50/10
10,135,303 B2 * 11/2018 Moyer ..................... H02J 5/00

(Continued)

FOREIGN PATENT DOCUMENTS

CN      202696123 U      1/2013
CN      103078381 A      5/2013

(Continued)

OTHER PUBLICATIONS

WU Xiao-kang et al., "Coil structure study and efficiency analysis for the driving wireless charging system of electric car", Advanced Technology of Electrical Engineering and Energy,vol. 35,No. 9,Sep. 2016,with an English abstract,total 6 pages.

*Primary Examiner* — Richard V Muralidar
(74) *Attorney, Agent, or Firm* — WOMBLE BOND DICKINSON (US) LLP

(57) ABSTRACT

This application discloses a wireless charging receiver and a wireless charging method. The method includes: receiving, by using a first oscillation circuit, pulse energy emitted by a transmitter, where the first oscillation circuit includes a first receiving coil configured to convert the pulse energy and output power; when a voltage value output by the first oscillation circuit reaches a first reference voltage value, sending a power transfer instruction to the transmitter, so that the transmitter emits energy according to the power transfer instruction, where the first reference voltage value is a working voltage threshold of a processor; and receiving, by using a second oscillation circuit, the energy emitted by the transmitter according to the power transfer instruction.

20 Claims, 9 Drawing Sheets

(58) Field of Classification Search
USPC .................................................. 320/106, 108
See application file for complete search history.

(56) References Cited

U.S. PATENT DOCUMENTS

| | | | |
|---|---|---|---|
| 10,998,776 B2* | 5/2021 | Chen | ........................ H02J 7/02 |
| 2013/0300351 A1 | 11/2013 | Gu et al. | |
| 2015/0318900 A1* | 11/2015 | Shimokawa | ............ H02J 50/40 |
| | | | 307/104 |
| 2015/0333530 A1 | 11/2015 | Moyer et al. | |
| 2019/0312459 A1* | 10/2019 | Garbus | ............... H02J 7/00034 |

FOREIGN PATENT DOCUMENTS

| | | | |
|---|---|---|---|
| CN | 105684263 A | 6/2016 | |
| CN | 105895330 A | 8/2016 | |
| CN | 106208410 A | 12/2016 | |
| CN | 106560970 A | 4/2017 | |
| CN | 106953419 A | 7/2017 | |
| CN | 107565700 A | 1/2018 | |
| CN | 107834710 A | 3/2018 | |
| CN | 108521841 A | 9/2018 | |
| CN | 109861353 A | 6/2019 | |
| KR | 20120066281 A | 6/2012 | |
| KR | 20140008706 A | 1/2014 | |
| KR | 20180058557 A | 6/2018 | |

* cited by examiner

WIRELESS CHARGING RECEIVER AND WIRELESS CHARGING METHOD

CROSS-REFERENCE TO RELATED APPLICATIONS

This application a continuation of International Application No. PCT/CN2019/105341, filed on Sep. 11, 2019, which claims priority to Chinese Patent Application No. 201910074396.7, filed on Jan. 25, 2019. The disclosures of the aforementioned applications are hereby incorporated by reference in their entireties

TECHNICAL FIELD

This application relates to the field of electronic technologies, and in particular, to a wireless charging receiver and a wireless charging method.

BACKGROUND

Wireless power transfer (WPT), also referred to as a wireless charging technology, is replacing conventional wired power transfer. A wireless charging transmitter for wireless charging may supply power to a wireless charging receiver for wireless charging, without relying on a charging cable. For example, when a mobile phone is charged, wireless charging is directly performed without connecting the mobile phone to a charging cable. There are a plurality of embodiments for the wireless charging technology. In the field of consumer electronics, an electromagnetic induction wireless charging technology is currently widely used. Based on the electromagnetic induction wireless charging technology, the Wireless Power Consortium has defined an international wireless charging standard Qi, the Qi standard for short, which is compatible with all rechargeable electronic devices.

Currently, a majority of wireless charging transmitters for wireless charging in the market are single-coil wireless charging transmitters based on the Qi standard. Interaction between a wireless charging transmitter and a wireless charging receiver includes three phases: selection, ping, and power transfer. In the ping phase, the wireless charging transmitter emits ping pulse energy in an attempt to find whether an object contains a wireless charging receiver. After the ping pulse energy received by the wireless charging receiver reaches a threshold of the wireless charging receiver, the wireless charging receiver establishes a power connection to the wireless charging transmitter, so that the wireless charging transmitter finds that the object contains the wireless charging receiver. This is known as successful ping. After the successful ping, the interaction proceeds to the next phase, that is, the power transfer phase. Space in which the wireless charging transmitter can successfully ping the wireless charging receiver is referred to as a degree of freedom.

Because the Qi standard specifies an upper limit of power of the ping pulse energy emitted by the wireless charging transmitter in the ping phase, a receiving coil of the wireless charging receiver is restricted by reactive components and transfer efficiency, and a coupling factor between the wireless charging receiver and the wireless charging transmitter is relatively low. Therefore, there is a technical defect that the degree of freedom is relatively low.

SUMMARY

Embodiments of this application provide a wireless charging receiver and a wireless charging method. Because a new coil with a greater inductance, that is, a first receiving coil, is disposed in the wireless charging receiver, a coupling factor between the wireless charging receiver and a wireless charging transmitter in a ping phase is higher, and a degree of freedom is improved. After a preset voltage value of the wireless charging receiver is reached, the wireless charging receiver receives, by using the receiving coil, energy transferred by the wireless charging transmitter. This ensures transfer efficiency while improving the degree of freedom.

According to a first aspect, this application provides a wireless charging receiver, including:

a first oscillation circuit, where the first oscillation circuit includes at least one first receiving coil, and the first oscillation circuit is configured to receive pulse energy emitted by a wireless charging transmitter;

a second oscillation circuit, where the second oscillation circuit includes at least one second receiving coil, and the second oscillation circuit is configured to receive energy emitted by the wireless charging transmitter according to a power transfer instruction;

a communications module, where the communications module is configured to send the power transfer instruction to the wireless charging transmitter; and a processor, where the processor is configured:

for the wireless charging receiver to receive, by using the first oscillation circuit, the pulse energy emitted by the wireless charging transmitter, where the first oscillation circuit includes the at least one first receiving coil, and the first receiving coil is configured to convert the pulse energy and output power;

for the wireless charging receiver to: when a voltage value output by the first oscillation circuit reaches a first reference voltage value, send the power transfer instruction to the wireless charging transmitter by using the communications module, so that the wireless charging transmitter emits the energy according to the power transfer instruction, where the first reference voltage value is a working voltage threshold of the processor; and for the wireless charging receiver to receive, by using the second oscillation circuit, the energy emitted by the wireless charging transmitter according to the power transfer instruction, where the second oscillation circuit includes the at least one second receiving coil, and the energy emitted by the wireless charging transmitter according to the power transfer instruction and received by the second oscillation circuit is used to supply power to an electrical load in the wireless charging receiver, where an inductance of the first receiving coil is greater than that of the second receiving coil, or a coupling factor between the first receiving coil and a transmitting coil is greater than a coupling factor between the second receiving coil and the transmitting coil, or an inductance of the first receiving coil is greater than that of the second receiving coil and a coupling factor between the first receiving coil and a transmitting coil is greater than a coupling factor between the second receiving coil and the transmitting coil.

In an embodiment of the application, the wireless charging receiver receives, by using the first oscillation circuit, the pulse energy emitted by the wireless charging transmitter, where the first oscillation circuit includes the at least one first receiving coil, and the first receiving coil is configured to convert the pulse energy and output the power;

when the voltage value output by the first oscillation circuit reaches the first reference voltage value, the wireless charging receiver sends the power transfer instruction to the wireless charging transmitter by using the communications module, so that the wireless charging transmitter emits the energy according to the power transfer instruction; and the wireless charging receiver receives, by using the second oscillation circuit, the energy emitted by the wireless charging transmitter according to the power transfer instruction, where the second oscillation circuit includes the at least one second receiving coil, and the received energy emitted by the wireless charging transmitter according to the power transfer instruction is used to supply power to the load in the wireless charging receiver, where the inductance of the first receiving coil is greater than that of the second receiving coil, or the coupling factor between the first receiving coil and the transmitting coil is greater than a coupling factor between the second receiving coil and the transmitting coil, or the inductance of the first receiving coil is greater than that of the second receiving coil and the coupling factor between the first receiving coil and the transmitting coil is greater than the coupling factor between the second receiving coil and the transmitting coil. Because a new coil with a greater inductance, that is, the first receiving coil, is disposed in the wireless charging receiver, a coupling factor between the wireless charging receiver and the wireless charging transmitter in a ping phase is higher, and a degree of freedom is improved. After a preset voltage value of the wireless charging receiver is reached, the wireless charging receiver receives, by using the receiving coil, energy transferred by the wireless charging transmitter. This ensures transfer efficiency while improving the degree of freedom.

In an embodiment of the first aspect, the processor is further configured to: receive, by using the first oscillation circuit, the energy emitted by the wireless charging transmitter according to the power transfer instruction; and when the voltage value output by the first oscillation circuit rises to a second reference voltage value, switch, by the processor, from the first oscillation circuit to the second oscillation circuit, where the second reference voltage value is greater than the first reference voltage value. When the voltage value output by the first oscillation circuit rises to the second reference voltage, the processor in the wireless charging receiver switches from the first oscillation circuit to the second oscillation circuit. This avoids abnormal working caused by a voltage drop in a circuit switching process, and enhances working stability of the wireless charging receiver.

In an embodiment of the first aspect, the communications module includes at least one of an amplitude shift keying module, a frequency shift keying module, or a phase shift keying module. In the wireless charging receiver, the communications module configured to send the power transfer instruction to the wireless charging transmitter may be implemented by any one of the amplitude shift keying module, the frequency shift keying module, or the phase shift keying module. This enhances flexibility of the wireless charging receiver.

In an embodiment of the first aspect, the communications module includes a communication modulation module; and the processor is configured to: generate the power transfer instruction by adjusting the communication modulation module in the communications module; and send the power transfer instruction to the wireless charging transmitter by using the communications module. In the wireless charging receiver, the processor generates the power transfer instruction by adjusting the communication modulation module in the communications module; and after the communication modulation module generates the power transfer instruction, the communications module sends the instruction to the wireless charging transmitter. This enhances feasibility of the solution.

In an embodiment of the first aspect, the processor is configured to: adjust a voltage value of the communication modulation module by adjusting a capacitor or resistor in the communication modulation module; and generate the power transfer instruction based on a change of the voltage value of the communication modulation module. In the wireless charging receiver, the processor adjusts the voltage value of the communication modulation module by adjusting the capacitance or resistance in the communication modulation module. Because the wireless charging transmitter dynamically adjusts, based on the received voltage value of the oscillation circuit in the wireless charging receiver, the energy emitted to the wireless charging receiver, a change process of the voltage value is referred to as generation of the power transfer instruction. This enhances feasibility of the solution.

In an embodiment of the first aspect, the wireless charging receiver further includes a rectifier module and a voltage step-down module, the rectifier module and the voltage step-down module are connected in series, the rectifier module and the first receiving coil in the first oscillation circuit are connected in series, and the rectifier module and the second receiving coil in the second oscillation circuit are connected in series; the rectifier module is configured to convert the pulse energy received by the corresponding coils in the first oscillation circuit and the second oscillation circuit or the energy emitted by the wireless charging transmitter according to the power transfer instruction into a direct current, where the direct current is used to supply power to the load in the wireless charging receiver; and the voltage step-down module is configured to perform voltage step-down processing on the direct current output by the rectifier module. The rectifier module and the voltage step-down module are disposed in the wireless charging receiver, so that the wireless charging receiver can adjust an output voltage based on an actual requirement. This enhances practical applicability of the wireless charging receiver.

In an embodiment of the first aspect, the rectifier module includes an uncontrolled rectifier module or a synchronous rectifier module, where the synchronous rectifier module includes at least one metal oxide semi-conductor field effect transistor, and the uncontrolled rectifier module includes at least one diode. This enhances flexibility of the wireless charging receiver.

In an embodiment of the first aspect, the second oscillation circuit further includes a first switch, the first oscillation circuit further includes a second switch, the first switch and the first receiving coil are connected in series, the second switch and the second receiving coil are connected in series, and the first switch and the second switch are connected in parallel. This enhances flexibility of the wireless charging receiver.

In an embodiment of the first aspect, the second oscillation circuit and the first oscillation circuit further include a third switch, the second oscillation circuit and the first oscillation circuit share the third switch, and when the third switch is in a first state, the first receiving coil and the second receiving coil are connected in series, and the second oscillation circuit and the first oscillation circuit are closed, or when the third switch is in a second state, the second oscillation circuit is open and the first oscillation circuit is closed. This enhances flexibility of the wireless charging receiver.

According to a second aspect, this application provides a wireless charging method, where a wireless charging receiver receives, by using a first oscillation circuit, pulse energy emitted by a wireless charging transmitter, where the first oscillation circuit includes at least one first receiving coil, and the first receiving coil is configured to convert the pulse energy and output power; when a voltage value output by the first oscillation circuit reaches a first reference voltage value, the wireless charging receiver sends a power transfer instruction to the wireless charging transmitter by using a communications module, so that the wireless charging transmitter emits energy according to the power transfer instruction; and the wireless charging receiver receives, by using a second oscillation circuit, the energy emitted by the wireless charging transmitter according to the power transfer instruction, where the second oscillation circuit includes at least one second receiving coil, and the energy emitted by the wireless charging transmitter according to the power transfer instruction and received by the second oscillation circuit is used to supply power to an electrical load in the wireless charging receiver, where an inductance of the first receiving coil is greater than that of the second receiving coil, or a coupling factor between the first receiving coil and a transmitting coil is greater than a coupling factor between the second receiving coil and the transmitting coil, or an inductance of the first receiving coil is greater than that of the second receiving coil and a coupling factor between the first receiving coil and a transmitting coil is greater than a coupling factor between the second receiving coil and the transmitting coil. Because a new coil with a greater inductance, that is, the first receiving coil, is disposed in the wireless charging receiver, a coupling factor between the wireless charging receiver and the wireless charging transmitter in a ping phase is higher, and a degree of freedom is improved. After a preset voltage value of the wireless charging receiver is reached, the wireless charging receiver receives, by using the receiving coil, energy transferred by the wireless charging transmitter. This ensures transfer efficiency while improving the degree of freedom.

In an embodiment of the second aspect, after the wireless charging receiver sends the power transfer instruction to the wireless charging transmitter, the method further includes: the wireless charging receiver receives, by using the first oscillation circuit, the energy emitted by the wireless charging transmitter according to the power transfer instruction; and when the voltage value output by the first oscillation circuit rises to a second reference voltage value, the wireless charging receiver switches from the first oscillation circuit to the second oscillation circuit, where the second reference voltage value is greater than the first reference voltage value. When the voltage value output by the first oscillation circuit rises to the second reference voltage, a processor in the wireless charging receiver switches from the first oscillation circuit to the second oscillation circuit. This avoids abnormal working caused by a voltage drop in a circuit switching process, and enhances working stability of the wireless charging receiver.

In an embodiment of the second aspect, that the wireless charging receiver sends a power transfer instruction to the wireless charging transmitter by using a communications module includes: the wireless charging receiver generates the power transfer instruction by adjusting a communication modulation module in the communications module; and the wireless charging receiver sends the power transfer instruction to the wireless charging transmitter by using the communications module. In the wireless charging receiver, the processor generates the power transfer instruction by adjusting the communication modulation module in the communications module; and after the communication modulation module generates the power transfer instruction, the communications module sends the instruction to the wireless charging transmitter. This enhances feasibility of the solution.

In an embodiment of the second aspect, that the wireless charging receiver generates the power transfer instruction by adjusting a communication resistor-capacitor module in the communications module includes: the wireless charging receiver adjusts a voltage value of the communication resistor-capacitor module by adjusting a capacitor or resistor in the communication modulation module; and the wireless charging receiver generates the power transfer instruction based on a change of the voltage value of the communication resistor-capacitor module. In the wireless charging receiver, the processor adjusts the voltage value of the communication modulation module by adjusting the capacitance or resistance in the communication modulation module. Because the wireless charging transmitter dynamically adjusts, based on the received voltage value of the oscillation circuit in the wireless charging receiver, the energy emitted to the wireless charging receiver, a change process of the voltage value is referred to as generation of the power transfer instruction. This enhances feasibility of the solution.

According to a third aspect, this application provides a wireless charging receiver, including:

- a receiving unit, configured to receive, by a wireless charging receiver by using a first oscillation circuit, pulse energy emitted by a wireless charging transmitter, where the first oscillation circuit includes at least one first receiving coil, and the first receiving coil is configured to convert the pulse energy and output power; and
- a sending unit, configured for the wireless charging receiver to: when a voltage value output by the first oscillation circuit reaches a first reference voltage value, send a power transfer instruction to the wireless charging transmitter by using a communications module, so that the wireless charging transmitter emits energy according to the power transfer instruction, where the first reference voltage value is a working voltage threshold of a processor, where
- the receiving unit is further configured for the wireless charging receiver to receive, by using a second oscillation circuit, the energy emitted by the wireless charging transmitter according to the power transfer instruction, where the second oscillation circuit includes at least one second receiving coil, and the energy emitted by the wireless charging transmitter according to the power transfer instruction and received by the second oscillation circuit is used to supply power to an electrical load in the wireless charging receiver, where an inductance of the first receiving coil is greater than that of the second receiving coil, or a coupling factor between the first receiving coil and a transmitting coil is greater than a coupling factor between the second receiving coil and the transmitting coil, or an inductance of the first receiving coil is greater than that of the second receiving coil and a coupling factor between the first receiving coil and a transmitting coil is greater than a coupling factor between the second receiving coil and the transmitting coil. Because a new coil with a greater inductance, that is, the first receiving coil, is disposed in the wireless charging receiver, a coupling factor between the wireless charging receiver and the wireless charging transmitter in a ping phase is higher, and a degree of freedom is improved. After a preset voltage value of the wireless charging receiver is reached, the wireless charging receiver receives, by using the receiving coil, energy transferred by the wireless charging transmitter. This ensures transfer efficiency while improving the degree of freedom.

In the third aspect of this application, components of the wireless charging receiver may further perform the steps described in various possible embodiments of the first aspect and the second aspect. For details, refer to the descriptions in the various possible embodiments of the first aspect and the second aspect.

According to a fourth aspect of this application, this application provides a chip system, where the chip system includes a processor configured to support a network device in implementing functions in the foregoing aspect, for example, sending or processing data and/or information in the foregoing method. In an embodiment, the chip system further includes a memory, where the memory is configured to store a program instruction and data required by the network device. The chip system may include a chip, or may include a chip and another discrete component.

As can be learned from the foregoing technical solutions, the embodiments of this application have the following advantages:

Because a new coil with a greater inductance, that is, the first receiving coil, is disposed in the wireless charging receiver, the coupling factor between the wireless charging receiver and the wireless charging transmitter in the ping phase is higher, and the degree of freedom is improved. After the preset voltage value of the wireless charging receiver is reached, the wireless charging receiver receives, by using the receiving coil, the energy transferred by the wireless charging transmitter. This ensures transfer efficiency while improving the degree of freedom.

DESCRIPTION OF EMBODIMENTS

Embodiments of this application provide a wireless charging receiver and a wireless charging method. Because a new coil with a greater inductance, that is, a first receiving coil, is disposed in the wireless charging receiver, a coupling factor between the wireless charging receiver and a wireless charging transmitter in a ping phase is higher, and a degree of freedom is improved. After a preset voltage value of the wireless charging receiver is reached, the wireless charging receiver receives, by using the receiving coil, energy transferred by the wireless charging transmitter. This ensures transfer efficiency while improving the degree of freedom.

To make persons skilled in the art understand the technical solutions in this application better, the following describes the technical solutions in the embodiments of this application with reference to the accompanying drawings in the embodiments of this application.

Figure 1:
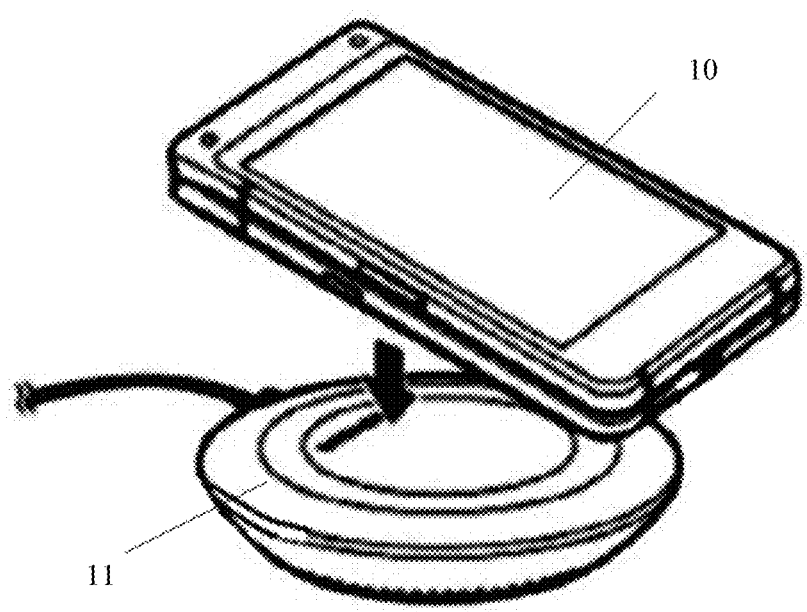
FIG. 1 is a schematic architectural diagram of a wireless charging system according to an embodiment of this application.

FIG. 1 is a schematic architectural diagram of a wireless charging system according to an embodiment of this application. As shown in FIG. 1, the wireless charging system includes a wireless charging receiver 10 and a wireless charging transmitter 11. The wireless charging transmitter 11 may transfer power to the wireless charging receiver 10 to perform wireless charging on the wireless charging receiver 10.

The wireless charging receiver 10 may be mobile user equipment (UE), an access terminal, a subscriber unit, a subscriber station, a mobile station, a mobile, a remote station, a remote terminal, a user terminal, or a user agent. The access terminal may be a cellular phone, a handheld device having a wireless communication function, a computing device, an in-vehicle device, a wearable device, a terminal in a 5G system, a terminal in a future evolved public land mobile network (PLMN), or the like. In an embodiment, the wireless charging receiver 10 may be a mobile phone, a tablet computer (Pad), a computer having radio transmitting and receiving functions, a virtual reality (VR) terminal device, an augmented reality (AR) terminal device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, or the like.

The wireless charging receiver 10 may also be a wireless charging electromobile, a smartphone, a tablet personal computer (PC), an e-book reader, a desktop PC, a laptop PC, a netbook computer, a workstation, a server, a personal digital assistant (PDA), a portable multimedia player (PMP), an MP3 player, a mobile medical device, a camera, or a wearable device (such as smart glasses, a head-mounted device (HMD), electronic clothing, an electronic bracelet, an electronic necklace, an electronic application accessory (or appcessory), an electronic tattoo, a smartmirror, or a smartwatch). The wireless charging receiver 10 may also be a smart home appliance. The smart home appliance may be, for example, a television (TV), a digital video disc (DVD) player, an audio player, a refrigerator, an air conditioner, a cleaner, an oven, a microwave oven, a washing machine, an air purifier, a set-top box, a home automation control panel, a security control panel, a TV box (for example, Samsung HomeSync™, Apple TV™, or Google TV™), a game console (for example, Xbox™ or PlayStation™), an electronic dictionary, an electronic key, a camcorder, or a digital photo frame. The wireless charging receiver 10 may also be various medical devices (for example, various portable medical instruments such as a blood glucose meter, a heart rate meter, a sphygmomanometer, and a thermometer), magnetic resonance angiography (MRA) equipment, magnetic resonance imaging (MRI) equipment, computed tomography (CT) equipment, a medical camcorder, or an ultrasonic device), a navigation device, a global positioning system (GPS) wireless charging receiver, an event data recorder (EDR), a flight data recorder (FDR), an automotive infotainment device, a marine electronic device (for example, a marine navigation device or a gyro compass), avionics, a security device, a car head unit, an industrial or household robot, an automatic teller machine (ATM) for banks, a point of sale (POS) for shops, or an Internet of Things (IoT) device (for example, an electronic bulb, various sensors, an electricity or gas meter, a water sprayer, a fire alarm, a thermostat, a street light, a toaster, fitness equipment, a hot water tank, a heater, or a boiler). The wireless charging receiver 10 may also be a part of furniture or a building/structure, an electronic board, an electronic signature receiving device, a projector, or various meters (for example, a water meter, an electricity meter, or a gas meter). In various embodiments, the wireless charging receiver 10 may be one or a combination of the foregoing devices. The wireless charging receiver according to some embodiments may be a flexible electronic device. In addition, the wireless charging receiver according to the embodiments of the present disclosure is not limited to the foregoing devices, and may be a new wireless charging receiver introduced with advancement of technologies.

Figure 2:
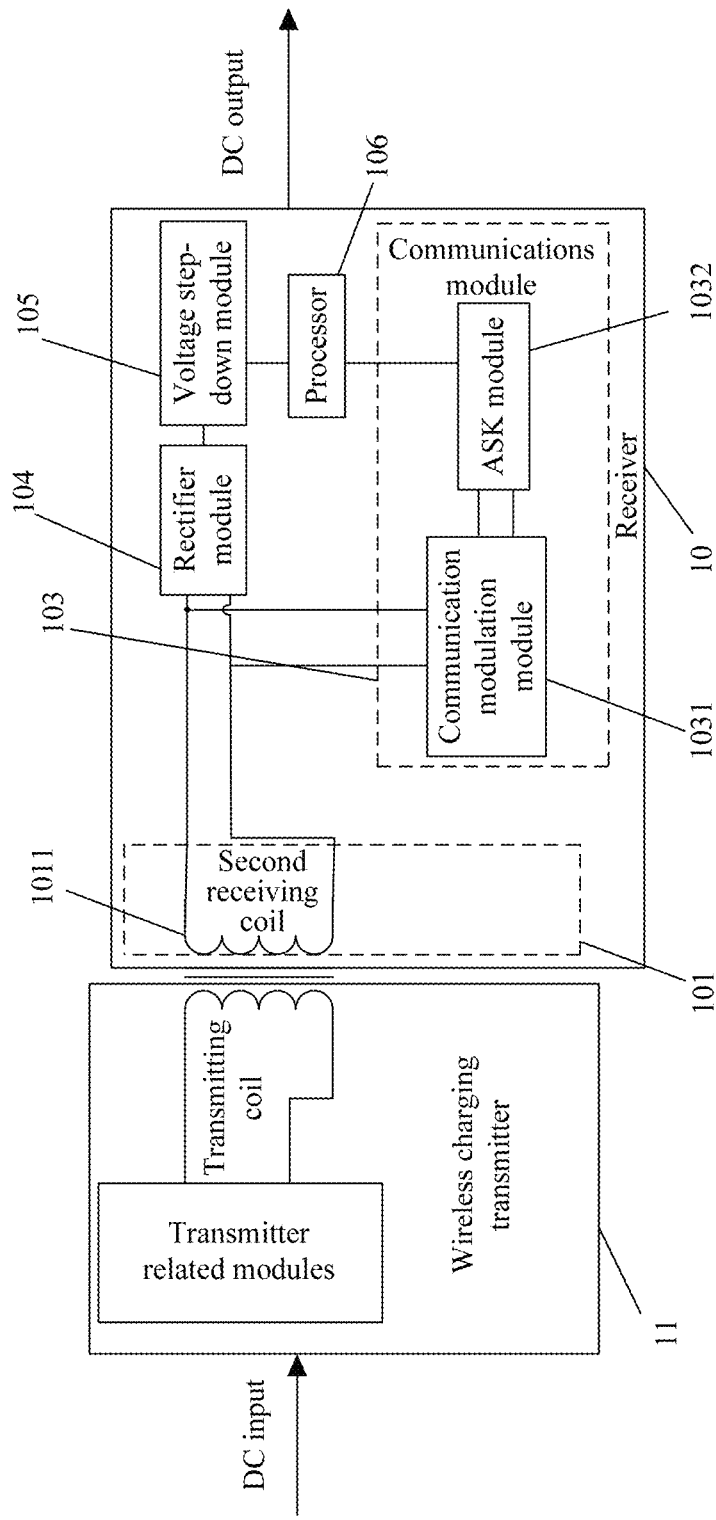
FIG. 2 is a schematic diagram of an equivalent circuit of a wireless charging system according to an embodiment of this application.

FIG. 2 is a schematic diagram of an equivalent circuit of a wireless charging system according to an embodiment of this application. The wireless charging system includes a wireless charging receiver 10 and a wireless charging transmitter 11. The wireless charging receiver 10 includes a receiving coil 101, a communications module 103, a rectifier module 104, a voltage step-down module 105, and a processor 106. The communications module 103 includes a communication modulation module 1031. The receiving coil 101 includes a second receiving coil 1011. The wireless charging transmitter 11 includes a transmitting coil and wireless charging transmitter related modules.

It should be noted that FIG. 2 is a schematic diagram of a series-series compensation (SS) equivalent circuit of a loosely coupled transformer including the wireless charging transmitter 11 and the wireless charging receiver 10. Alternatively, an embodiment of the wireless charging transmitter 11 and the wireless charging receiver 10 may be parallel-parallel compensation (PP), series-parallel compensation (SP), or parallel-series compensation (PS) equivalent circuit diagrams. The implementation is not limited herein, and only SS compensation is used for description in this application.

The wireless charging receiver 10 provided in an embodiment of the application may further use a magnetic resonance wireless charging technology, a near field communication (NFC) wireless charging technology, or a microwave wireless charging technology, in addition to an electromagnetic induction wireless charging technology. The technology that is used is not limited herein. In this application, only the electromagnetic induction wireless charging technology is used for description.

A data communication mode between the wireless charging transmitter 11 and the wireless charging receiver 10 may be wireless communication, such as intraband communication (In-Band), Bluetooth communication, Zigbee communication (Zigbee), or Wi-Fi communication.

The wireless charging transmitter related modules may include a direct current power supply of the wireless charging transmitter, a direct current/alternating current conversion module of the wireless charging transmitter, a series matching capacitor of the wireless charging transmitter, and a control module of the wireless charging transmitter. The wireless charging transmitter 11 processes, by using the wireless charging transmitter related modules and the transmitting coil, a direct current (DC) input to the wireless charging transmitter, and then transmits the direct current to the receiving coil 101 of the wireless charging receiver 10 by using the transmitting coil.

The process in which the wireless charging transmitter 11 processes the direct current by using the wireless charging transmitter related modules may include the following operations: The direct current power supply of the wireless charging transmitter is configured to provide charging power. The direct current/alternating current conversion module of the wireless charging transmitter is connected to the direct current power supply of the wireless charging transmitter, and is configured to receive the direct current output by the direct current power supply of the wireless charging transmitter, and convert the received direct current into an alternating current for output. The series matching capacitor of the wireless charging transmitter is connected to the transmitting coil to form an oscillation circuit. The oscillation circuit is connected to the direct current/alternating current conversion module of the wireless charging transmitter, and is configured to receive the alternating current output by the direct current/alternating current conversion module of the wireless charging transmitter, and provide the alternating current to the transmitting coil. Through coupling of the transmitting coil and the receiving coil 101, power of the transmitting coil is transferred to the receiving coil 101. The control module may be connected to the direct current power supply of the wireless charging transmitter, the direct current/alternating current conversion module of the wireless charging transmitter, the series matching capacitor of the wireless charging transmitter, and the transmitting coil respectively, and is configured to exchange a control parameter with each module to implement control on each module.

In the wireless charging receiver 10, the receiving coil 101 may be connected to a series matching capacitor of the wireless charging receiver to form an oscillation circuit of the wireless charging receiver 10. The receiving coil 101 receives the power transferred by the transmitting coil through coil coupling, and the power is converted by the oscillation circuit into an alternating current. The rectifier module 104 is connected to the oscillation circuit, and is configured to receive the alternating current output by the oscillation circuit, transform the alternating current to obtain an output voltage $V_{rect}$, rectify the output voltage $V_{rect}$ to eliminate a fluctuation of the output voltage, and output a stable output voltage $V_{rect}$. The voltage step-down module 105 is connected to the rectifier module 104, and is configured to perform voltage step-down processing on the stable output voltage $V_{rect}$ output by the rectifier module 104, to meet a voltage value required by an electrical load connected to the voltage step-down module 105. The electrical load is connected to the voltage regulator module 105, and is configured to receive an output voltage Vout output by the voltage step-down module 105. The communications module 103 is configured to implement digital communication with the wireless charging transmitter 11. There are a plurality of communication modes, such as intraband communication (In-Band), Bluetooth communication, Zigbee communication (Zigbee), and Wi-Fi communication. In an embodiment of the application, intraband communication is used as an example for description, and an actual communication mode is not limited.

The processor 106 delivers a power transfer instruction to an ASK module 1032 in the communications module 103, and the ASK module 1032 in the communications module 103 may adjust the communication modulation module 1031 to implement intraband communication between the wireless charging receiver 10 and the wireless charging transmitter 11. A manner of adjusting the communication modulation module 1031 is as follows: using a switched capacitor for modulation and/or using a switched resistor for modulation. The communications module 103 modulates the power transfer instruction from the processor 106 by using the ASK module 1032, and adjusts connection and disconnection of a related capacitor and/or resistor in the communication modulation module 1031 according to the power transfer instruction, so that the capacitor and/or resistor in the communication modulation module 1031 are/is connected to the circuit of the wireless charging receiver 10 or not connected to the circuit of the wireless charging receiver 10, thereby changing the current or voltage of the receiving coil 101 in the wireless charging receiver 10, so that a voltage or current of the wireless charging transmitter 11 changes. The wireless charging transmitter 11 acquires the voltage or current, and performs demodulation processing and analysis to obtain the power transfer instruction sent by the wireless charging receiver 10. The processor 106 may be connected to the receiving coil 101, the communications module 103, the rectifier module 104, and the voltage step-down module 105 respectively, and is configured to exchange a control parameter with each module to implement control on each module.

The rectifier module 104 includes an uncontrolled rectifier module or a synchronous rectifier module. The uncontrolled rectifier module includes at least one diode. The synchronous rectifier module includes at least one metal oxide semi-conductor field effect transistor (MOSFET). When the module included in the rectifier module 104 is the uncontrolled rectifier module, the oscillation circuit in the wireless charging receiver 10 is referred to as a diode full-bridge rectifier circuit. When the module included in the rectifier module 104 is the synchronous rectifier module, the oscillation circuit in the wireless charging receiver 10 is referred to as a switching transistor synchronous rectifier circuit. Alternatively, when the rectifier module 104 is another module, the oscillation circuit in the wireless charging receiver 10 may be a half-bridge rectifier circuit, or may be another rectifier circuit that converts an alternating current into a direct current. This is not limited in an embodiment of the application.

Figure 3A:
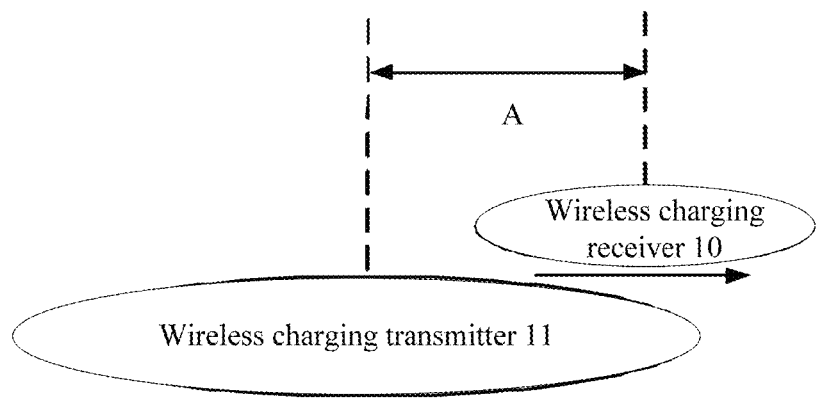
FIG. 3a is a schematic diagram of a degree of freedom according to an embodiment of this application.
Figure 3B:
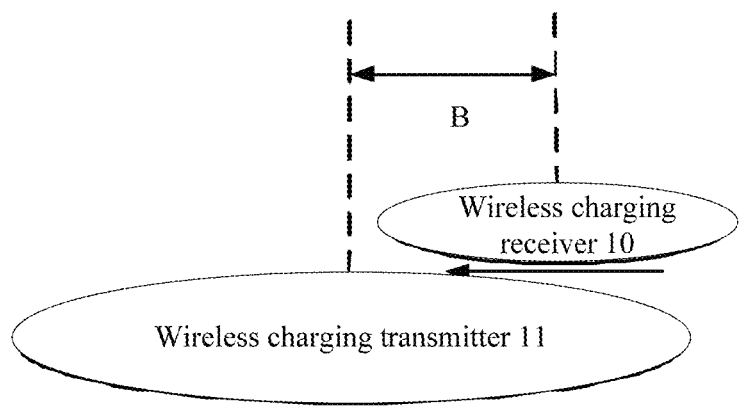
FIG. 3b is another schematic diagram of a degree of freedom according to an embodiment of this application.

In actual use, a degree of freedom in the wireless charging technology is one of key indicators that affect actual experience of a user. The following describes the concept of the degree of freedom. FIG. 3a is a schematic diagram of a degree of freedom according to an embodiment of this application. FIG. 3b is another schematic diagram of a degree of freedom according to an embodiment of this application.

FIG. 3a and FIG. 3b show a range of space in which the wireless charging receiver 10 can be charged when placed on a surface of the wireless charging transmitter 11. FIG. 3a shows that the wireless charging receiver 10 moves outward from a central point of the wireless charging transmitter 11 to a boundary of a non-chargeable range after the wireless charging receiver 10 establishes a charging connection to the wireless charging transmitter 11, where a range of space within the non-chargeable boundary is denoted as A. It should be noted that A is a three-dimensional variable representing the range of space and that A in FIG. 3b indicates a cross-sectional radius value of the three-dimensional space. A boundary condition of the non-chargeable range is as follows: The power emitted by the wireless charging transmitter 11 to the wireless charging receiver 10 reaches an upper limit of the power that the wireless charging transmitter 11 can output. In this case, the voltage $V_{rect}$ output by the wireless charging receiver 10 after the wireless charging receiver 10 receives the output power meets a working voltage threshold of the processor 106 in the wireless charging receiver 10. In this case, the power emitted by the wireless charging transmitter 11 has reached the upper limit of the power that the wireless charging transmitter 11 can transfer. Therefore, when the wireless charging receiver 10 continues to move away from the wireless charging transmitter 11, the voltage $V_{rect}$ output by the wireless charging receiver 10 after the wireless charging receiver 10 receives the power transferred from the wireless charging transmitter 11 is lower than the working voltage threshold of the processor 106, the processor 106 cannot work normally, the charging connection established between the wireless charging receiver 10 and the wireless charging transmitter 11 is disconnected, and the wireless charging receiver 10 cannot be charged. A working state of the wireless charging receiver 10 at the boundary of the non-chargeable range is referred to as a critical power outage state.

FIG. 3b shows that the wireless charging receiver 10 moves from outer space of the wireless charging transmitter 11 toward the central point of the wireless charging transmitter 11 to a boundary of a chargeable range when the wireless charging receiver 10 has not established a charging connection to the wireless charging transmitter 11, where a range of space within the boundary of the chargeable range is denoted as B. It should be noted that B is a three-dimensional variable representing the range of space and that B in FIG. 3b indicates a cross-sectional radius value of the three-dimensional space. A boundary condition of the chargeable range is as follows: When the wireless charging receiver 10 has not established a charging connection to the wireless charging transmitter 11, energy emitted by the wireless charging transmitter 11 by using the transmitting coil is pulse energy, and the pulse energy is referred to as ping pulse energy. Therefore, a phase from when the wireless charging receiver 10 has not established a charging connection to the wireless charging transmitter 11 to when the wireless charging receiver 10 establishes a charging connection to the wireless charging transmitter 11 is referred to as a ping phase. As the wireless charging receiver 10 approaches the central point of the wireless charging transmitter 11, the voltage $V_{rect}$ output by the wireless charging receiver 10 after the wireless charging receiver 10 receives the ping pulse energy gradually rises. When the wireless charging receiver 10 moves to the boundary of the chargeable range, $V_{rect}$ reaches the working voltage threshold of the processor 106, the processor 106 works normally and sends a power transfer instruction to the wireless charging transmitter 11 by using the communications module 103, and the wireless charging transmitter 11 stops sending ping pulse energy according to the power transfer instruction and sends non-pulse power instead. A state in which the working voltage threshold of the processor 106 is reached is referred to as successful ping of the wireless charging receiver 10. In this position, the wireless charging receiver 10 establishes a normal charging connection to the wireless charging transmitter 11, and the wireless charging receiver 10 can be charged normally.

The wireless charging receiver 10 can be charged within both A and B. According to the Qi standard specified by the WPC, in the current wireless charging system, the range of A is greater than the range of B. Therefore, the range of B is defined as a degree of freedom.

For ease of understanding the embodiments of this application, some concepts or terms in the embodiments of this application are explained below.

(1) Coupling Factor

The coupling factor is used to represent tightness of the coupling between the transmitting coil in the wireless charging transmitter 11 and the receiving coil 101 in the wireless charging receiver 10. If the coupling factor is higher, efficiency of transferring power from the transmitting coil in the wireless charging transmitter 11 to the receiving coil 101 in the wireless charging receiver 10 is higher. The coupling factor is related to a position offset between the two (wireless charging transmitter 11 and wireless charging receiver 10). If the position offset between the wireless charging transmitter 11 and the wireless charging receiver 10 is greater, the transmitting coil in the wireless charging transmitter 11 and the receiving coil 101 in the wireless charging receiver 10 are less tightly coupled, and the coupling factor is smaller. Therefore, during wireless charging, if the position offset between the wireless charging transmitter 11 and the wireless charging receiver 10 is smaller, charging efficiency of the wireless charging system is higher. In other words, the coupling factor is determined by the position offset between the wireless charging transmitter 11 and the wireless charging receiver 10. The position offset herein is a position offset between the transmitting coil in the wireless charging transmitter 11 and the receiving coil 101 in the wireless charging receiver 10. For understanding the offset, refer to FIG. 3a and FIG. 3b. A and B are also a type of position offset and are not described again herein.

(2) Inductance

The inductance is a physical quantity denoted by a symbol L, and its value is referred to as inductance. An alternating current resistance (ACR) and reactive power of a coil restrict infinite increase of an inductance for the following reasons: 1. The inductance is proportional to a square of a quantity of turns of the coil. To increase the inductance in same stacking space, the quantity of turns needs to be increased. After the quantity of turns is increased, a diameter of a winding inevitably becomes smaller, the ACR increases, a coil loss increases, and efficiency is reduced. 2. Power consumed by magnetic field generation by the coil, charging and discharging of a capacitor, or the like is referred to as reactive power. The reactive power depends on matching of the inductance of the coil and a capacitance in a resonant circuit. Therefore, for minimization of the reactive power, the inductance need to be controlled within a certain range and cannot increase infinitely.

The Qi standard specifies an upper limit of power of the ping pulse energy emitted by the wireless charging transmitter 11; the wireless charging receiver 10 is restricted by an application environment; for example, when the wireless charging receiver 10 is a smartwatch, the wireless charging receiver 10 is restricted by a size of the smartwatch, and a size of the receiving coil 101 of the wireless charging receiver 10 cannot be excessively large, causing the coupling factor between the wireless charging receiver 10 and the wireless charging transmitter 11 to be relatively low; and when wireless charging is performed on the wireless charging receiver 10, the receiving coil 101 is restricted by reactive power, and the quantity of turns and the size of the coil cannot be excessively large. Due to impact of the foregoing factors, the wireless charging receiver 10 can be pinged successfully and establish a charging connection to the wireless charging transmitter 11 only when the wireless charging receiver 10 is relatively close to the wireless charging transmitter 11. This causes a lower degree of freedom and affects experience of the user in using the wireless charging receiver.

Figure 4:
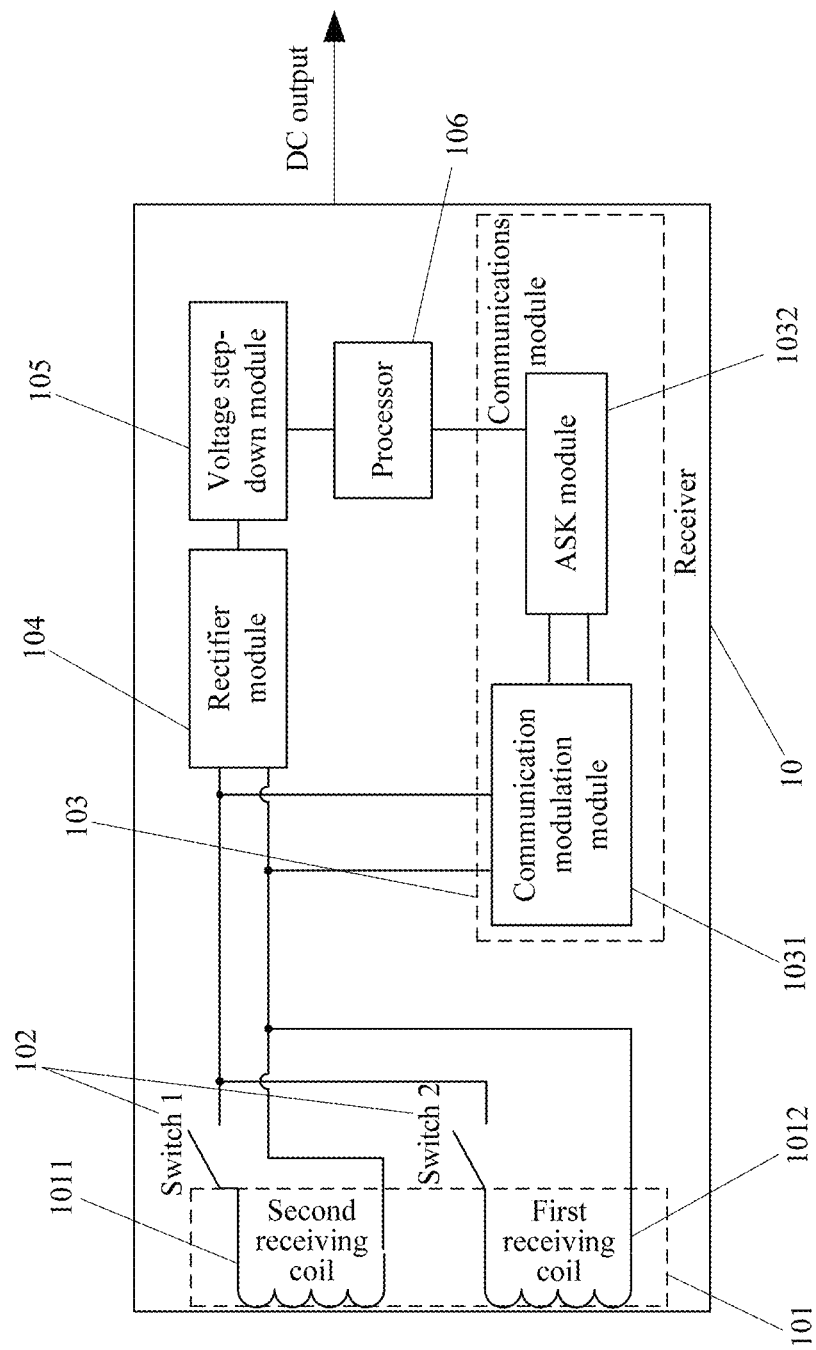
FIG. 4 is a schematic diagram of an embodiment of a wireless charging receiver according to an embodiment of this application.

Based on the schematic diagram of the wireless charging receiver 10 in the wireless charging system in FIG. 2, this application provides a wireless charging method and device. The following describes a wireless charging receiver 10 provided in an embodiment of this application. FIG. 4 is a schematic diagram of an embodiment of a wireless charging receiver according to an embodiment of this application. A first receiving coil 1012 is added to the wireless charging receiver 10, and an original receiving coil is referred to as a second receiving coil 1011. The first receiving coil 1012 and the second receiving coil 1011 constitute a receiving coil 101 of the wireless charging receiver 10. An inductance of the first receiving coil 1012 is greater than that of the second receiving coil 1011. A switch module 102 for controlling the receiving coil 101 is added. The switch module 102 may connect or disconnect the second receiving coil 1011 and the first receiving coil 1012 of the receiving coil 101 to or from oscillation circuits separately. It should be noted that in an embodiment of the application, quantities of second receiving coils 1011 and first receiving coils 1012 are not limited, and only a case in which the second receiving coil 1011 is one coil and the first receiving coil 1012 is one coil is used as an example for description. A circuit to which the second receiving coil 1011 is connected is referred to as a second oscillation circuit, and a circuit to which the first receiving coil 1012 is connected is referred to as a first oscillation circuit. The second oscillation circuit and the first oscillation circuit may be connected in parallel or connected in series. When the second oscillation circuit and the first oscillation circuit are connected in series, the second receiving coil 1011 and the first receiving coil 1012 are connected in series. When the second oscillation circuit and the first oscillation circuit are connected in parallel, the second receiving coil 1011 and the first receiving coil 1012 are connected in parallel. A switch module 102 is added. The switch module 102 may be a fully-controlled power electronic device, such as a MOS transistor and its drive circuit, or may be a switch function integrated in a processor 106. This is not limited herein.

In an embodiment, the wireless charging receiver 10 connects the first receiving coil 1012 to the oscillation circuit by using the switch module 102. A connection mode may be: opening a switch 1 in the switch module 102, so that the second receiving coil 1011 is disconnected and that the second oscillation circuit is open; and closing a switch 2 in the switch module 102, so that the first receiving coil 1012 is connected to the circuit and that the first oscillation circuit is closed. The wireless charging receiver 10 receives, by using the first receiving coil 1012, ping pulse energy emitted by a wireless charging transmitter 11. The first oscillation circuit receives the ping pulse energy. After a voltage $V_{rect}$ output from an output end of a rectifier module 104 reaches a working voltage threshold of the processor 106, the processor 106 starts to work. After the processor 106 starts to work, the processor 106 sends a power transfer instruction to the wireless charging transmitter 11 by using a communications module 103. The power transfer instruction is generated by the processor 106 through a communication modulation module 1031, and sent to the wireless charging transmitter 11 by using an ASK module 1032. The wireless charging transmitter 11 stops sending ping pulse energy according to the power transfer instruction and sends continuous power instead. The wireless charging receiver 10 connects the second receiving coil 1011 to the oscillation circuit by using the switch module 102. A connection mode may be: opening the switch 2 in the switch module 102, so that the first receiving coil 1012 is disconnected and that the first oscillation circuit is open; and closing the switch 1 in the switch module 102, so that the second receiving coil 1011 is connected and that the second oscillation circuit is closed. The wireless charging receiver 10 receives, by using the second receiving coil 1011, continuous power emitted by the wireless charging transmitter 11, and the wireless charging receiver 10 uses the power to supply power to an electrical load.

In an embodiment of this application, the wireless charging receiver 10 uses the first receiving coil 1012 with a greater inductance to receive ping pulse energy. In a ping phase, the wireless charging receiver 10 may reach the working voltage threshold of the processor 106 over a longer distance, and start the processor 106 to send a power transfer instruction to the wireless charging transmitter 11, so that the wireless charging transmitter 11 sends stable power to the wireless charging receiver 10 and enters a power transfer phase. In the power transfer phase, the wireless charging receiver 10 uses the second receiving coil 1011 with a lower inductance to avoid excessively high reactive power and improve power transfer efficiency, while ensuring power reception.

Figure 5:
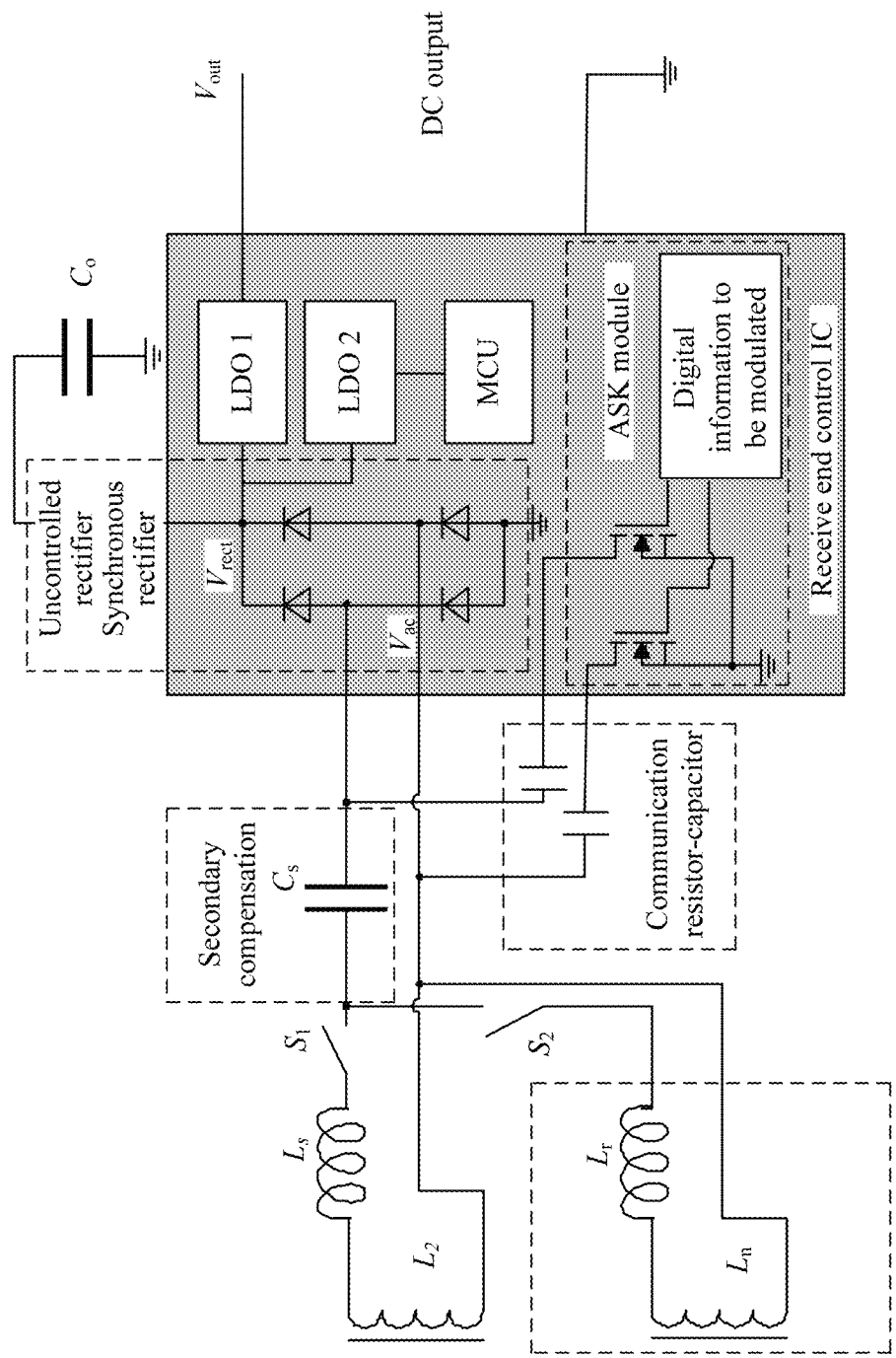
FIG. 5 is a schematic diagram of an equivalent circuit of a wireless charging receiver according to an embodiment of this application.

On a basis of FIG. 1 to FIG. 4, because there are a plurality of embodiments for each module in the wireless charging receiver 10, the following further describes the technical solution of this application. FIG. 5 is a schematic diagram of an equivalent circuit of a wireless charging receiver according to an embodiment of this application.

In an embodiment, a first receiving coil 1012 includes an $L_n$ coil and an $L_r$ coil. In the first receiving coil 1012, the $L_n$ coil is a main coil for receiving power emitted by a wireless charging transmitter 11 by using magnetic lines. In the first receiving coil 1012, the $L_r$ coil is a coil for receiving magnetic lines emitted by the wireless charging transmitter 11 but not received by the $L_n$ coil. Generally, the $L_r$ coil is referred to as a leakage inductor of the $L_n$ coil. A second receiving coil 1011 includes an $L_2$ coil and an Ls coil, and the Ls coil is a leakage inductor of the $L_2$ coil. A switch module 102 includes a switch $S_1$ and a switch $S_2$. The switch $S_1$ controls the second receiving coil 1011. The switch $S_2$ controls the first receiving coil 1012. The second receiving coil 1011 and the first receiving coil 1012 are connected in parallel. A series matching capacitor of the wireless charging receiver is a secondary compensation capacitor Cs, which is connected to a second oscillation circuit or a first oscillation circuit in series. A rectifier module 104 is an uncontrolled rectifier module including four diodes connected in parallel. A voltage step-down module 105 includes two low dropout regulators (LDO) connected in parallel, where an LDO 1 is responsible for supplying power to an electrical load, and an LDO 2 is responsible for supplying power to a processor 106. The processor 106 is a micro controller unit (MCU).

A working mode is as follows: In a ping connection phase, the switch $S_2$ is closed and the switch $S_1$ is open, so that the first receiving coil 1012 is connected to the circuit and that the first oscillation circuit is closed. The wireless charging receiver 10 is coupled, by using the first receiving coil 1012, to the wireless charging transmitter 11 to receive ping pulse energy emitted by the wireless charging transmitter 11. After a voltage $V_{rect}$ rises to a working voltage threshold of the LDO 2 in the voltage step-down module 105 in the wireless charging receiver 10, the processor 106 in the wireless charging receiver 10 starts to work, where the working voltage threshold of the LDO 2 is referred to as a first reference voltage value. After the processor 106 starts to work, the processor 106 instructs the voltage step-down module 105 to increase the preset first reference voltage value to a second reference voltage value. After the first reference voltage value is set to the second reference voltage value, the wireless charging receiver 10 uses an intraband communication mode to modulate a power transfer instruction by using a communication resistor-capacitor module in a communication modulation module 1031 in a communications module 103, and sends the power transfer instruction to the wireless charging transmitter 11 by using an ASK module 1032 in the communications module 103, so that the wireless charging receiver 10 receives stable energy emitted by the wireless charging transmitter 11 and that the voltage in the LDO 2 reaches the second reference voltage value. After the voltage in the LDO 2 reaches the second reference voltage value, the processor 106 controls the switch $S_1$ in the switch module 102 to close and the switch $S_2$ to open, so that the second receiving coil 1011 is connected to the circuit. In this case, the second oscillation circuit is closed, and the first oscillation circuit is open. The LDO 1 in the voltage step-down module 105 is turned on under control of the processor 106, and the wireless charging receiver 10 supplies power to the electrical load after the LDO 1.

In an embodiment of the application, before the wireless charging receiver 10 switches the receiving coil 101, the voltage in the wireless charging receiver 10 may be increased to ensure that in a process of switching the receiving coil 101 by using the switch module 102, the processor 106 in the wireless charging receiver 10 does not work abnormally due to a voltage drop. This enhances running stability of the wireless charging receiver 10.

Figure 6:
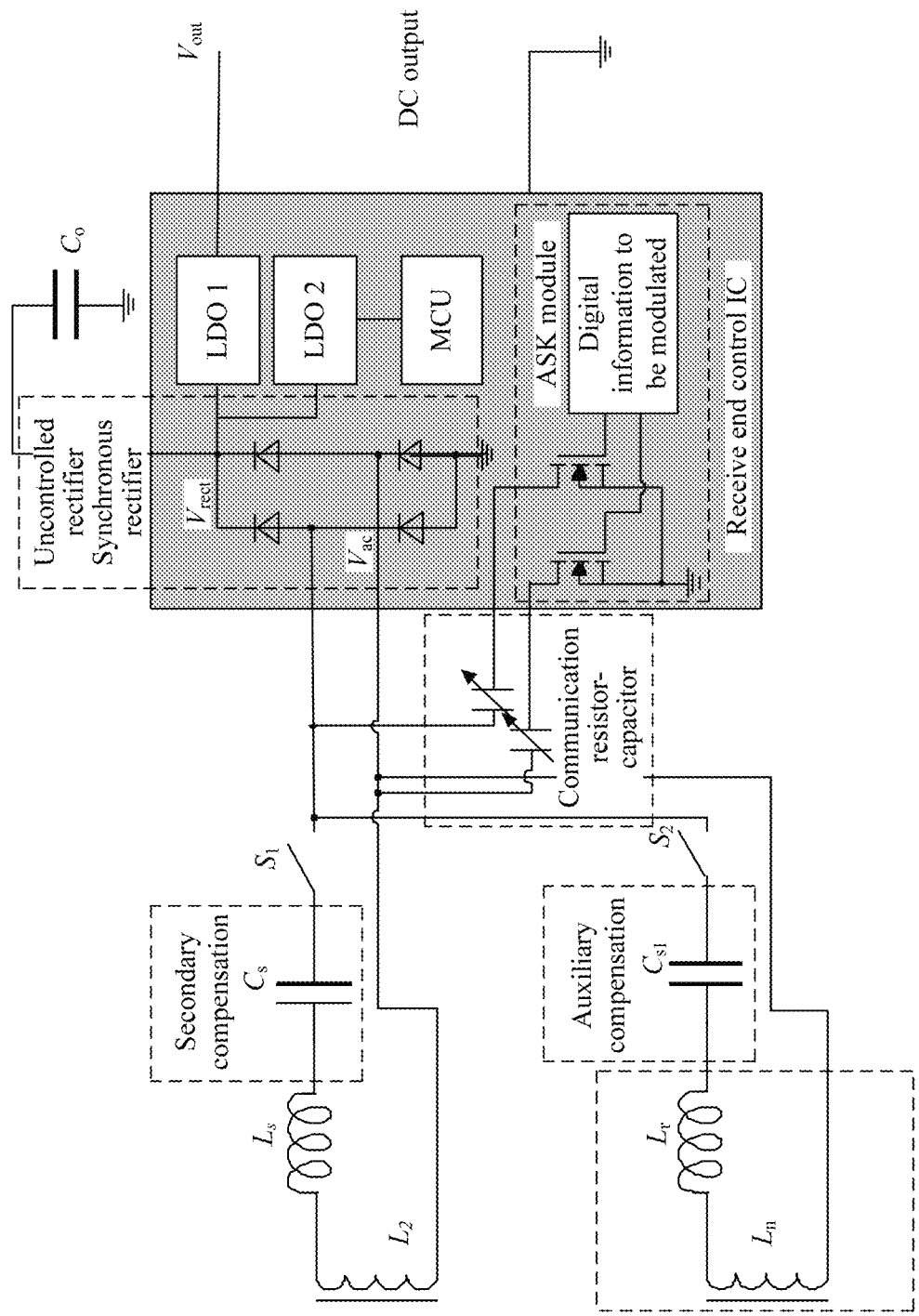
FIG. 6 is a schematic diagram of another equivalent circuit of a wireless charging receiver according to an embodiment of this application.

On a basis of FIG. 5, FIG. 6 is a schematic diagram of another equivalent circuit of a wireless charging receiver according to an embodiment of this application.

In an embodiment, on the basis of FIG. 5, to avoid a problem that a series matching capacitor of a wireless charging receiver mismatches a first oscillation circuit, two independent series matching capacitors that correspond to a second receiving coil 1011 in a second oscillation circuit and a first receiving coil 1012 in the first oscillation circuit are disposed in the wireless charging receiver, where a series matching capacitor connected to the second receiving coil 1011 in series is a secondary compensation capacitor $C_{S1}$, and a series matching capacitor connected to the first receiving coil 1012 in series is an auxiliary compensation capacitor $C_{S2}$. The secondary compensation capacitor $C_{S1}$ runs when the second oscillation circuit is closed. The auxiliary compensation capacitor $C_{S2}$ runs when the first oscillation circuit is closed. In addition, to avoid a problem that a nonadjustable communication resistor-capacitor used in a communication modulation module 1031 mismatches the first oscillation circuit, two independent communication resistor-capacitors corresponding to the second receiving coil 1011 in the second oscillation circuit and the first receiving coil 1012 in the first oscillation circuit are disposed, where one works when the second oscillation circuit is closed, and one works when the first oscillation circuit is closed. Alternatively, an adjustable communication resistor-capacitor may be disposed. When the second oscillation circuit is closed, parameters matching the second oscillation circuit are used. When the first oscillation circuit is closed, parameters matching the first oscillation circuit are used.

In an embodiment of the application, the wireless charging receiver 10 may use two series matching capacitors of the wireless charging receiver with different parameters to ensure that a voltage $V_{rect}$ has sufficient gains under two working conditions when different coils are connected. The wireless charging receiver 10 may use two communication resistor-capacitors with different parameters or one communication resistor-capacitor with adjustable parameters to ensure working stability of a communications module 103 under two working conditions when different coils are connected.

Figure 7:
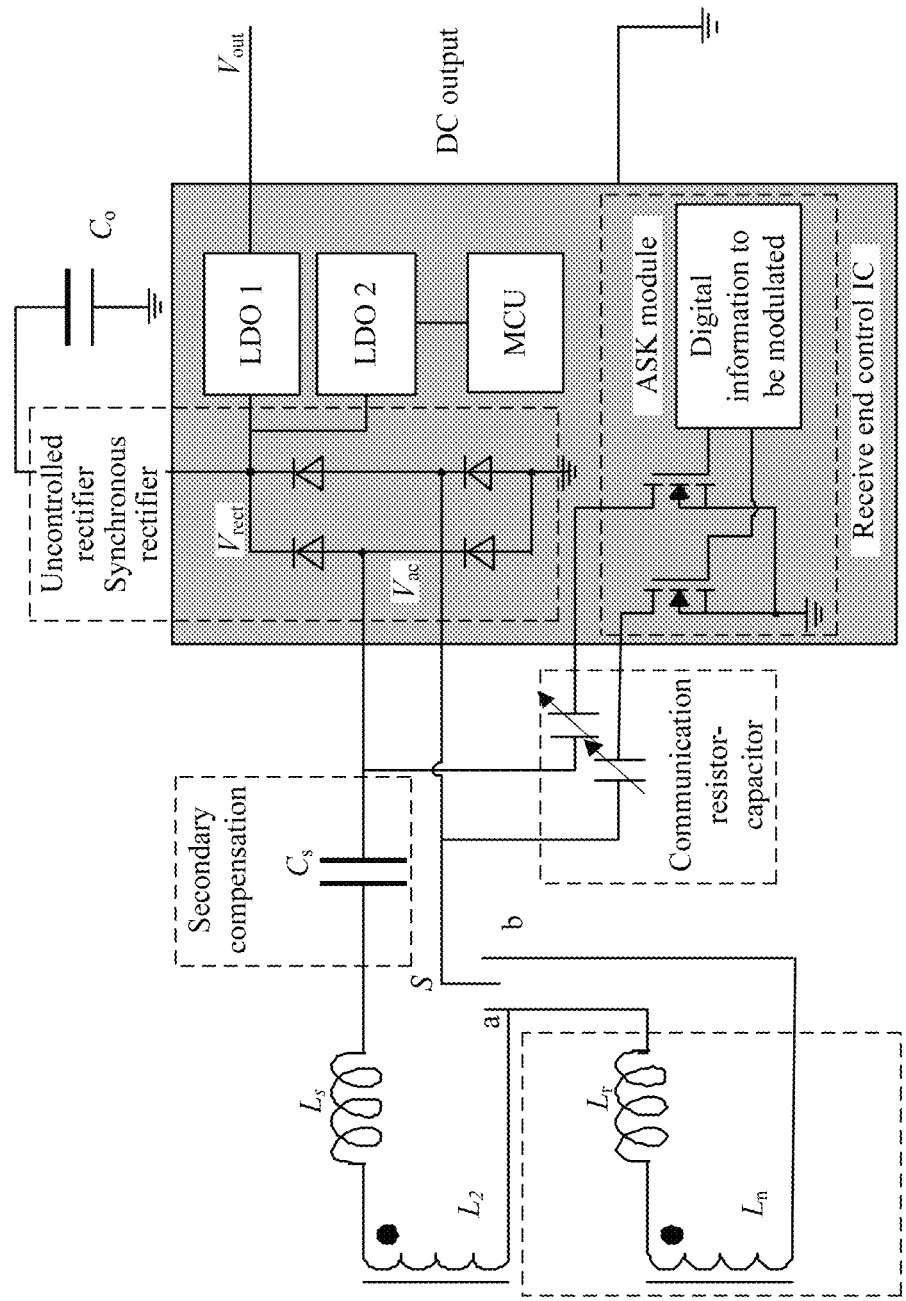
FIG. 7 is a schematic diagram of another equivalent circuit of a wireless charging receiver according to an embodiment of this application.

On a basis of FIG. 5 or FIG. 6, FIG. 7 is a schematic diagram of another equivalent circuit of a wireless charging receiver according to an embodiment of this application.

In an embodiment, a switch module 102 is a single-pole double-throw switch S, which controls a second receiving coil 1011 and a first receiving coil 1012 to connect to the circuit. A working mode is as follows: In a ping connection phase, the single-pole double-throw switch S is connected to a point b. In this case, the second receiving coil 1011 and the first receiving coil 1012 are connected to the circuit in series, and the wireless charging receiver 10 receives, by using both the second receiving coil 1011 and the first receiving coil 1012, ping pulse energy emitted by a wireless charging transmitter 11. In this case, a second oscillation circuit and a first oscillation circuit are connected in series. When a voltage $V_{rect}$ rises to a working voltage threshold of an LDO 2 in a voltage step-down module 105 in the wireless charging receiver 10, a processor 106 in the wireless charging receiver 10 starts to work, where the working voltage threshold of the LDO 2 is referred to as a first reference voltage value. After the processor 106 starts to work, the processor 106 instructs the voltage step-down module 105 to increase the preset first reference voltage value to a second reference voltage value. After the first reference voltage value is set to the second reference voltage value, the wireless charging receiver 10 uses an intraband communication mode to modulate a power transfer instruction by using a communication resistor-capacitor in a communication modulation module 1031 in a communications module 103, and sends the power transfer instruction to the wireless charging transmitter 11 by using an ASK module 1032 in the communications module 103, so that the wireless charging receiver 10 receives stable energy emitted by the wireless charging transmitter 11 and that the voltage in the LDO 2 reaches the second reference voltage value. When the voltage in the LDO 2 reaches the second reference voltage value, the processor 106 controls the single-pole double-throw switch S in the switch module 102 to disconnect from the point b and connect to a point a, so that the first oscillation circuit is open and that the first receiving coil 1012 is disconnected. The wireless charging receiver 10 uses only the second receiving coil 1011 to receive stable power emitted by the wireless charging transmitter 11, and the wireless charging receiver 10 uses the power to supply power to an electrical load.

In an embodiment of the application, the wireless charging receiver 10 uses the single-pole double-throw switch. In the ping connection state, the second receiving coil 1011 and the first receiving coil 1012 are both used to receive the ping pulse energy emitted by the wireless charging transmitter 11, to improve a degree of freedom. In a power transfer phase, the wireless charging receiver 10 uses only the second receiving coil 1011 through the single-pole double-throw switch to receive energy, to avoid excessive reactive power and improve power transfer efficiency.

It should be understood that, the processor mentioned in the embodiments of this application may be a micro controller unit (MCU) or a central processing unit (CPU), or the processor may be another general purpose processor, a digital signal processor (DSP), an application specific integrated circuit (ASIC), a field programmable gate array (FPGA), or another programmable logic device, discrete gate or transistor logic device, discrete hardware component, or the like. The general purpose processor may be a microprocessor, or the processor may be any conventional processor or the like.

The following describes a wireless charging method in this application with reference to an embodiment and an accompanying drawing. In an embodiment, the wireless charging method provided in this application includes the following embodiment.

Figure 8:
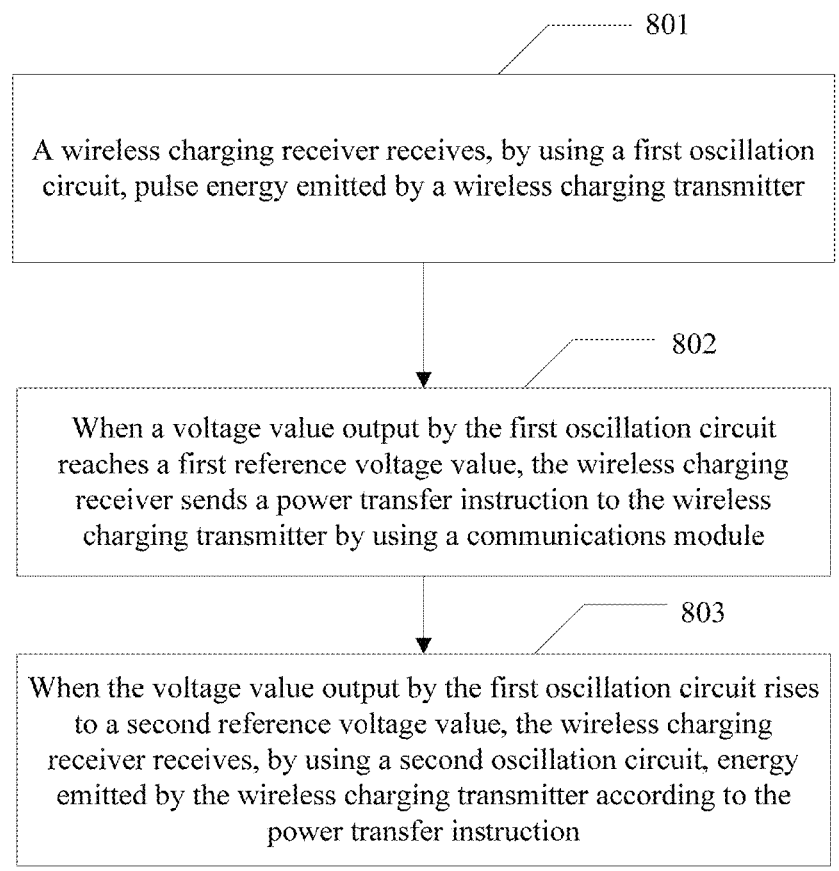
FIG. 8 is a schematic diagram of an embodiment of a wireless charging method according to an embodiment of this application.

FIG. 8 is a schematic diagram of an embodiment of a wireless charging method according to an embodiment of this application. The embodiment of the wireless charging method in an embodiment of the application includes the following operations.

801. A wireless charging receiver receives, by using a first oscillation circuit, pulse energy emitted by a wireless charging transmitter.

In an embodiment, the wireless charging receiver receives, by using the first oscillation circuit, the pulse energy emitted by the wireless charging transmitter, where the first oscillation circuit includes at least one first receiving coil. The first receiving coil may be connected to a series matching capacitor of the wireless charging receiver to form a first oscillation circuit of the wireless charging receiver. The first oscillation circuit receives, through coupling of the first receiving coil, power transferred by a transmitting coil in the wireless charging transmitter, and the power is converted by the oscillation circuit into an alternating current.

It should be noted that the Qi standard specifies that before a power connection is established between the wireless charging receiver and the wireless charging transmitter, energy sent by the wireless charging transmitter to the wireless charging receiver is ping pulse energy, where the ping pulse energy is the pulse energy in an embodiment.

802. When a voltage value output by the first oscillation circuit reaches a first reference voltage value, the wireless charging receiver sends a power transfer instruction to the wireless charging transmitter by using a communications module.

In an embodiment, a rectifier module is connected to the first oscillation circuit, and is configured to receive the alternating current output by the first oscillation circuit, transform the alternating current to obtain an output voltage $V_{rect}$, rectify the output voltage $V_{rect}$ to eliminate a fluctuation of the output voltage, and output a stable output voltage $V_{rect}$. A voltage step-down module is connected to the rectifier module, and is configured to perform voltage step-down processing on the stable output voltage $V_{rect}$ output by the rectifier module, to meet a voltage value required by an electrical load connected to the voltage step-down module. The electrical load is connected to the voltage regulator module, and is configured to receive an output voltage Vout output by the voltage step-down module. When the voltage value $V_{rect}$ output by the first oscillation circuit reaches the first reference voltage value, the power transfer instruction is sent to the wireless charging transmitter by using the communications module. The communications module is configured to implement digital communication with the wireless charging transmitter. There are a plurality of communication modes, such as intraband communication (In-Band), Bluetooth communication, Zigbee communication (Zigbee), and Wi-Fi communication. In an embodiment, intraband communication is used as an example for description, and the first reference voltage value is a working voltage threshold of a processor.

The communications module modulates the power transfer instruction from the processor by using an ASK module 1032, and adjusts connection and disconnection of a related capacitor and/or resistor in a communication modulation module according to the power transfer instruction, so that the capacitor and/or resistor in the communication modulation module are/is connected to the circuit of the wireless charging receiver or not connected to the circuit of the wireless charging receiver, thereby changing the current or voltage of the receiving coil in the wireless charging receiver, so that a voltage or current of the wireless charging transmitter changes. The wireless charging transmitter acquires the voltage or current, and performs demodulation processing and analysis to obtain the power transfer instruction sent by the wireless charging receiver.

The first reference voltage value is usually set as the working voltage threshold of the processor in the wireless charging receiver. After the output voltage $V_{rect}$ output by the first oscillation circuit reaches the working voltage threshold of the processor, the processor can work normally. In this case, the processor may control the communications module to send the power transfer instruction to the wireless charging transmitter.

803. When the voltage value output by the first oscillation circuit rises to a second reference voltage value, the wireless charging receiver receives, by using a second oscillation circuit, energy emitted by the wireless charging transmitter according to the power transfer instruction.

In an embodiment, the processor may set the rectifier module connected to the first oscillation circuit, to adjust the output voltage $V_{rect}$ output by the first oscillation circuit from the first reference voltage value to the second reference voltage value, where the second reference voltage value is higher than the first reference voltage value. When the output voltage $V_{rect}$ reaches the second reference voltage value, the processor in the wireless charging receiver controls disconnection of the first receiving coil by using a switch module, and couples the second oscillation circuit to the wireless charging transmitter to receive power transferred by the wireless charging transmitter. The second oscillation circuit includes at least one second receiving coil. The switch module may be two independent switches respectively connected to the first receiving coil and the second receiving coil, or may be a single-pole double-throw switch.

An inductance of the first receiving coil is greater than that of the second receiving coil, or a coupling factor between the first receiving coil and the transmitting coil is greater than a coupling factor between the second receiving coil and the transmitting coil, or an inductance of the first receiving coil is greater than that of the second receiving coil and a coupling factor between the first receiving coil and the transmitting coil is greater than a coupling factor between the second receiving coil and the transmitting coil.

In an embodiment of the application, because a new coil with a greater inductance, that is, the first receiving coil, is disposed in the wireless charging receiver, a coupling factor between the wireless charging receiver and the wireless charging transmitter in a ping phase is higher, and a degree of freedom is improved. After a preset voltage value of the wireless charging receiver is reached, the wireless charging receiver receives, by using the receiving coil, energy transferred by the wireless charging transmitter. This ensures transfer efficiency while improving the degree of freedom.

Figure 9:
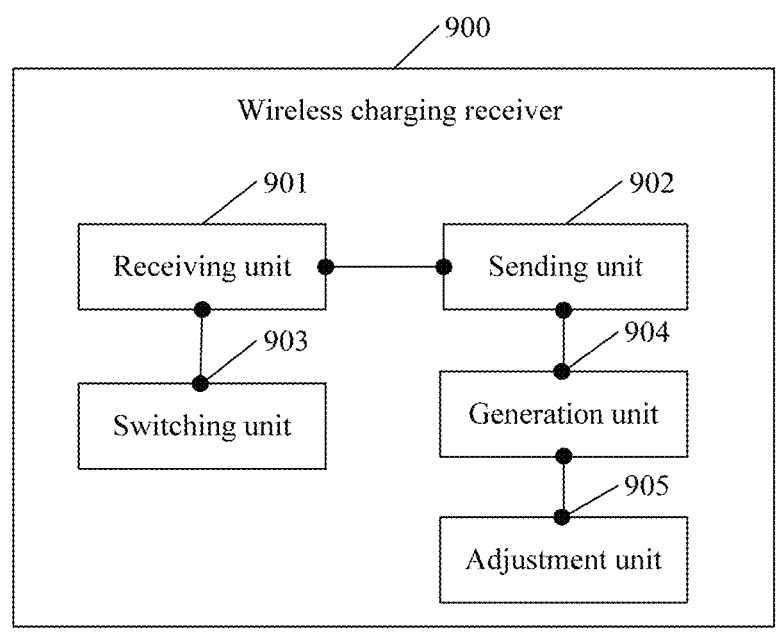
FIG. 9 is a schematic diagram of an embodiment of a wireless charging receiver according to an embodiment of this application.

Next, referring to FIG. 9, an embodiment of this application further provides a wireless charging receiver 900, including:

a receiving unit 901, configured for the wireless charging receiver 900 to receive, by using a first oscillation circuit in the receiving unit 901, pulse energy emitted by a wireless charging transmitter, where the first oscillation circuit includes at least one first receiving coil, and the first receiving coil is configured to convert the pulse energy and output power; and a sending unit 902, configured for by the wireless charging receiver 900 to: when a voltage value output by the first oscillation circuit in the receiving unit 901 reaches a first reference voltage value, send a power transfer instruction to the wireless charging transmitter by using a communications module in the sending unit 902, so that the wireless charging transmitter emits energy according to the power transfer instruction, where the receiving unit 901 is further configured for the wireless charging receiver 900 to receive, by using a second oscillation circuit in the receiving unit 901, the energy emitted by the wireless charging transmitter according to the power transfer instruction, where the second oscillation circuit includes at least one second receiving coil, and the energy emitted by the wireless charging transmitter according to the power transfer instruction is used to supply power to an electrical load in the wireless charging receiver 900, where an inductance of the first receiving coil is greater than that of the second receiving coil, or a coupling factor between the first receiving coil and a transmitting coil is greater than a coupling factor between the second receiving coil and the transmitting coil, or an inductance of the first receiving coil is greater than that of the second receiving coil and a coupling factor between the first receiving coil and a transmitting coil is greater than a coupling factor between the second receiving coil and the transmitting coil.

In an embodiment of the application, the wireless charging receiver 900 receives, by using the first oscillation circuit in the receiving unit 901, the pulse energy emitted by the wireless charging transmitter, where the first oscillation circuit includes the at least one first receiving coil, and the first receiving coil is configured to convert the pulse energy and output the power; when the voltage value output by the first oscillation circuit in the receiving unit 901 reaches the first reference voltage value, the wireless charging receiver 900 sends the power transfer instruction to the wireless charging transmitter by using the communications module in the sending unit 902, so that the wireless charging transmitter emits the energy according to the power transfer instruction; and the wireless charging receiver 900 receives, by using the second oscillation circuit in the receiving unit 901, the energy emitted by the wireless charging transmitter according to the power transfer instruction, where the second oscillation circuit includes the at least one second receiving coil, and the pulse energy or the energy emitted by the wireless charging transmitter according to the power transfer instruction is converted into a direct current used to supply power to the load in the wireless charging receiver

900, where the inductance of the first receiving coil is greater than that of the second receiving coil, or the coupling factor between the first receiving coil and the transmitting coil is greater than the coupling factor between the second receiving coil and the transmitting coil, or the inductance of the first receiving coil is greater than that of the second receiving coil and the coupling factor between the first receiving coil and the transmitting coil is greater than the coupling factor between the second receiving coil and the transmitting coil. Because a new coil with a greater inductance, that is, the first receiving coil, is disposed in the wireless charging receiver, a coupling factor between the wireless charging receiver and the wireless charging transmitter in a ping phase is higher, and a degree of freedom is improved. After a preset voltage value of the wireless charging receiver is reached, the wireless charging receiver receives, by using the receiving coil, energy transferred by the wireless charging transmitter. This ensures transfer efficiency while improving the degree of freedom.

In some embodiments of this application, the wireless charging receiver 900 further includes a switching unit 903, where the receiving unit 901 is configured for the wireless charging receiver 900 to receive, by using the first oscillation circuit in the receiving unit 901, the energy emitted by the wireless charging transmitter according to the power transfer instruction; and the switching unit 903 is configured for the wireless charging receiver 900 to: when the voltage value output by the first oscillation circuit in the receiving unit 901 rises to a second reference voltage value, switch from the first oscillation circuit to the second oscillation circuit, where the second reference voltage value is greater than the first reference voltage value.

In an embodiment of the application, when the voltage value output by the first oscillation circuit rises to the second reference voltage, the wireless charging receiver 900 switches from the first oscillation circuit to the second oscillation circuit. This avoids abnormal working caused by a voltage drop in a circuit switching process, and enhances working stability of the wireless charging receiver.

In some embodiments of this application, the wireless charging receiver 900 further includes a generation unit 904, where the generation unit 904 is configured for the wireless charging receiver 900 to generate the power transfer instruction by adjusting a communication modulation module in the communications module; and the sending unit 902 is configured for the wireless charging receiver 900 to send the power transfer instruction to the wireless charging transmitter by using the communications module in the sending unit 902.

In an embodiment of the application, the wireless charging receiver 900 generates the power transfer instruction by adjusting the communication modulation module in the communications module by using the generation unit 904, and after the generation unit 904 generates the power transfer instruction, the sending unit 902 sends the instruction to the wireless charging transmitter. This enhances feasibility of the solution.

In some embodiments of this application, the wireless charging receiver 900 further includes an adjustment unit 905, where the adjustment unit 905 is configured for the wireless charging receiver 900 to adjust a voltage value of the communication resistor-capacitor module by adjusting a capacitor or resistor in the communication modulation module; and the generation unit 904 is configured for the wireless charging receiver 900 to generate, the power transfer instruction based on a change of the voltage value of the communication resistor-capacitor module.

In an embodiment of the application, the wireless charging receiver 900 adjusts the voltage value of the communication modulation module by adjusting the capacitance or resistance in the communication modulation module by using the adjustment unit 905. Because the wireless charging transmitter dynamically adjusts, based on the received voltage value of the oscillation circuit in the wireless charging receiver 900, the energy emitted to the wireless charging receiver, a change process of the voltage value is referred to as generation of the power transfer instruction. This enhances feasibility of the solution.

In the specification, claims, and accompanying drawings of this application, the terms "first", "second", and so on are intended to distinguish between similar objects but do not necessarily indicate an order or sequence. It should be understood that the data termed in such a way are interchangeable in proper circumstances so that the embodiments of the present disclosure described herein can be implemented in other orders than the order illustrated or described herein. Moreover, the terms "include", "contain" and any other variants mean to cover the non-exclusive inclusion, for example, a process, method, system, product, or device that includes a list of operations or modules is not necessarily limited to those modules, but may include other modules not expressly listed or inherent to such a process, method, system, product, or device. Naming or numbering of operations in this application does not mean that the operations in the method process need to be performed in a time or logical sequence indicated by the naming or numbering. An execution sequence of the named or numbered process operations may be changed according to a technical objective to be achieved, provided that same or similar technical effects can be achieved.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual embodiment. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the operations of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

The invention claimed is:

1. A wireless charging receiver, comprising:
   a first oscillation circuit comprising at least one first receiving coil, wherein the first oscillation circuit is configured to receive pulse energy emitted by a wireless charging transmitter;
   a second oscillation circuit comprising at least one second receiving coil, wherein the second oscillation circuit is configured to receive energy emitted by the wireless charging transmitter according to a power transfer instruction;
   a communications interface configured to send the power transfer instruction to the wireless charging transmitter; and
   a processor configured to:
   receive, by using the first oscillation circuit, the pulse energy emitted by the wireless charging transmitter, wherein the first oscillation circuit comprises the at least one first receiving coil configured to convert the pulse energy and output power;
   when a voltage value output by the first oscillation circuit reaches a first reference voltage value, send the power transfer instruction to the wireless charging transmitter by using the communications interface, wherein the wireless charging transmitter emits the energy according to the power transfer instruction, and wherein the first reference voltage value is a working voltage threshold of the processor; and
   receive, by using the second oscillation circuit, the energy emitted by the wireless charging transmitter according to the power transfer instruction, wherein the second oscillation circuit comprises the at least one second receiving coil, wherein the energy emitted by the wireless charging transmitter according to the power transfer instruction and received by the second oscillation circuit is used to supply power to an electrical load in the wireless charging receiver, wherein an inductance of the first receiving coil is greater than that of the second receiving coil, or a coupling factor between the first receiving coil and a transmitting coil is greater than a coupling factor between the second receiving coil and the transmitting coil, or an inductance of the first receiving coil is greater than that of the second receiving coil and a coupling factor between the first receiving coil and the transmitting coil is greater than a coupling factor between the second receiving coil and the transmitting coil.

2. The wireless charging receiver according to claim 1, wherein the processor is further configured to:
   receive, by using the first oscillation circuit, the energy emitted by the wireless charging transmitter according to the power transfer instruction; and
   when the voltage value output by the first oscillation circuit reaches a second reference voltage value, switch from the first oscillation circuit to the second oscillation circuit, wherein the second reference voltage value is greater than the first reference voltage value.

3. The wireless charging receiver according to claim 2, wherein the communications interface comprises at least one of an amplitude shift keying module, a frequency shift keying module, or a phase shift keying module.

4. The wireless charging receiver according to claim 3, wherein the communications interface comprises a communication modulation module; and
   the processor is configured to:
   generate the power transfer instruction by adjusting the communication modulation module in the communications interface; and
   send the power transfer instruction to the wireless charging transmitter by using the communications interface.

5. The wireless charging receiver according to claim 4, wherein the processor is configured to:
   adjust a voltage value of the communication modulation module by adjusting a capacitor or resistor in the communication modulation module; and
   generate the power transfer instruction based on a change of the voltage value of the communication modulation module.

6. The wireless charging receiver according to claim 5, further comprising:
   a rectifier module and a voltage step-down module, wherein the rectifier module and the voltage step-down module are connected in series, wherein the rectifier module and the first receiving coil in the first oscillation circuit are connected in series, and wherein the rectifier module and the second receiving coil in the second oscillation circuit are connected in series;
   wherein the rectifier module is configured to convert the pulse energy received by the corresponding coils in the first oscillation circuit and the second oscillation circuit or the energy emitted by the wireless charging transmitter according to the power transfer instruction into a direct current used to supply power to the load in the wireless charging receiver; and
   the voltage step-down module is configured to perform voltage step-down processing on the direct current output by the rectifier module.

7. The wireless charging receiver according to claim 6, wherein the rectifier module comprises an uncontrolled rectifier module or a synchronous rectifier module comprising at least one metal oxide semi-conductor field effect transistor, and wherein the uncontrolled rectifier module comprises at least one diode.

8. The wireless charging receiver according to claim 7, wherein the second oscillation circuit further comprises a first switch, wherein the first oscillation circuit further comprises a second switch, wherein the first switch and the first receiving coil are connected in series, wherein the second switch and the second receiving coil are connected in series, and wherein the first switch and the second switch are connected in parallel.

9. The wireless charging receiver according to claim 7, wherein the second oscillation circuit and the first oscillation circuit further comprise a third switch, wherein the second oscillation circuit and the first oscillation circuit share the third switch, and wherein when the third switch is in a first state, the first receiving coil and the second receiving coil are connected in series, and the second oscillation circuit and the first oscillation circuit are closed, or when the third switch is in a second state, the second oscillation circuit is open and the first oscillation circuit is closed.

10. A wireless charging method, comprising:
receiving, by a wireless charging receiver by using a first oscillation circuit, pulse energy emitted by a wireless charging transmitter, wherein the first oscillation circuit comprises at least one first receiving coil to convert the pulse energy and output power;
when a voltage value output by the first oscillation circuit reaches a first reference voltage value, sending, by the wireless charging receiver, a power transfer instruction to the wireless charging transmitter by using a communications interface, wherein the wireless charging transmitter emits energy according to the power transfer instruction, wherein the first reference voltage value is a working voltage threshold of a processor; and
receiving, by the wireless charging receiver by using a second oscillation circuit, the energy emitted by the wireless charging transmitter according to the power transfer instruction, wherein the second oscillation circuit comprises at least one second receiving coil, wherein the energy emitted by the wireless charging transmitter according to the power transfer instruction and received by the second oscillation circuit is used to supply power to an electrical load in the wireless charging receiver, wherein an inductance of the first receiving coil is greater than that of the second receiving coil, or a coupling factor between the first receiving coil and a transmitting coil is greater than a coupling factor between the second receiving coil and the transmitting coil, or an inductance of the first receiving coil is greater than that of the second receiving coil and a coupling factor between the first receiving coil and the transmitting coil is greater than a coupling factor between the second receiving coil and the transmitting coil.

11. The method according to claim 10, wherein after the sending, a power transfer instruction to the wireless charging transmitter, the method further comprises:
receiving, by the wireless charging receiver by using the first oscillation circuit, the energy emitted by the wireless charging transmitter according to the power transfer instruction; and
when the voltage value output by the first oscillation circuit reaches a second reference voltage value, switching, by the wireless charging receiver, from the first oscillation circuit to the second oscillation circuit, wherein the second reference voltage value is greater than the first reference voltage value.

12. The method according to claim 11, wherein the sending a power transfer instruction to the wireless charging transmitter by using the communications interface comprises:
generating, by the wireless charging receiver, the power transfer instruction by adjusting a communication modulation module in the communications interface; and
sending, by the wireless charging receiver, the power transfer instruction to the wireless charging transmitter by using the communications interface.

13. The method according to claim 12, wherein the sending a power transfer instruction to the wireless charging transmitter by using the communications interface comprises:
generating, by the wireless charging receiver, the power transfer instruction by adjusting the communication modulation module in the communications interface; and
sending, by the wireless charging receiver, the power transfer instruction to the wireless charging transmitter by using the communications interface.

14. The method according to claim 13, wherein the generating the power transfer instruction by adjusting the communication modulation module in the communications interface comprises:
adjusting, by the wireless charging receiver, a voltage value of a communication resistor-capacitor module by adjusting a capacitor or resistor in the communication modulation module; and
generating, by the wireless charging receiver, the power transfer instruction based on a change of the voltage value of the communication resistor-capacitor module.

15. The method according to claim 14, wherein the wireless charging receiver further comprises a rectifier module and a voltage step-down module, wherein the rectifier module and the voltage step-down module are connected in series, wherein the rectifier module and the first receiving coil in the first oscillation circuit are connected in series, and wherein the rectifier module and the second receiving coil in the second oscillation circuit are connected in series;
wherein the rectifier module is configured to convert the pulse energy received by the corresponding coils in the first oscillation circuit and the second oscillation circuit or the energy emitted by the wireless charging transmitter according to the power transfer instruction into a direct current used to supply power to the load in the wireless charging receiver; and
the voltage step-down module is configured to perform voltage step-down processing on the direct current output by the rectifier module.

16. A wireless charging system, comprising:
a processor; and
a memory couple to the processor to store instructions, which when executed by the processor, cause the processor to perform operations, the operations comprising:
receiving, by using a first oscillation circuit, pulse energy emitted by a wireless charging transmitter, wherein the first oscillation circuit comprises at least one first receiving coil to convert the pulse energy and output power;
when a voltage value output by the first oscillation circuit reaches a first reference voltage value, sending a power transfer instruction to the wireless charging transmitter by using a communications interface, wherein the wireless charging transmitter emits energy according to the power transfer instruction, wherein the first reference voltage value is a working voltage threshold of the processor; and receiving, by using a second oscillation circuit, the energy emitted by the wireless charging transmitter according to the power transfer instruction, wherein the second oscillation circuit comprises at least one second receiving coil, wherein the energy emitted by the wireless charging transmitter according to the power transfer instruction and received by the second oscillation circuit is used to supply power to an electrical load, wherein an inductance of the first receiving coil is greater than that of the second receiving coil, or a coupling factor between the first receiving coil and a transmitting coil is greater than a coupling factor between the second receiving coil and the transmitting coil, or an inductance of the first receiving coil is greater than that of the second receiving coil and a coupling factor between the first receiving coil and the transmitting coil is greater than a coupling factor between the second receiving coil and the transmitting coil.

17. The system according to claim 16, wherein after the sending, a power transfer instruction to the wireless charging transmitter, the method further comprises:

receiving, by using the first oscillation circuit, the energy emitted by the wireless charging transmitter according to the power transfer instruction; and when the voltage value output by the first oscillation circuit reaches a second reference voltage value, switching from the first oscillation circuit to the second oscillation circuit, wherein the second reference voltage value is greater than the first reference voltage value.

18. The system according to claim 17, wherein the sending a power transfer instruction to the wireless charging transmitter by using the communications interface comprises:

generating the power transfer instruction by adjusting a communication modulation module in the communications interface; and sending the power transfer instruction to the wireless charging transmitter by using the communications interface.

19. The system according to claim 18, wherein the sending a power transfer instruction to the wireless charging transmitter by using the communications interface comprises:

generating the power transfer instruction by adjusting the communication modulation module in the communications interface; and sending the power transfer instruction to the wireless charging transmitter by using the communications interface.

20. The system according to claim 19, wherein the generating the power transfer instruction by adjusting the communication modulation module in the communications interface comprises:

adjusting a voltage value of a communication resistor-capacitor module by adjusting a capacitor or resistor in the communication modulation module; and generating the power transfer instruction based on a change of the voltage value of the communication resistor-capacitor module.

* * * * *